United States Patent [19]

Dieterich

[11] 4,382,299
[45] May 3, 1983

[54] DISC RECORD SYSTEM EMPLOYING SIGNAL REDUNDANCY

[75] Inventor: Charles B. Dieterich, Plainsboro, N.J.

[73] Assignee: RCA Corporation, New York, N.Y.

[21] Appl. No.: 204,826

[22] Filed: Nov. 7, 1980

[51] Int. Cl.³ .................... G06F 11/10; H04N 5/76
[52] U.S. Cl. .................................. 371/8; 360/38.1
[58] Field of Search ............... 371/8, 38, 65; 360/18, 360/24, 32, 38, 53; 358/128.5, 128.6

[56] References Cited

U.S. PATENT DOCUMENTS

| 3,781,795 | 12/1973 | Zegers | 371/8 |
| 4,001,496 | 1/1977 | Clemens et al. | 360/38 |
| 4,052,698 | 10/1977 | Ragle | 340/146.1 |
| 4,085,426 | 4/1978 | Aigrain et al. | 360/38 |
| 4,143,406 | 3/1979 | Tsuiki et al. | 360/48 |
| 4,145,683 | 3/1979 | Brookhart | 340/146.1 |
| 4,146,099 | 3/1979 | Matsushima et al. | 340/146.1 |
| 4,202,018 | 5/1980 | Stockham, Jr. | 360/53 |
| 4,211,997 | 7/1980 | Rudnick et al. | 371/38 |
| 4,227,221 | 10/1980 | Kanazawa | 360/24 |
| 4,308,557 | 12/1981 | Dieterich | 358/128.5 |

FOREIGN PATENT DOCUMENTS 1530341 10/1978 United Kingdom .

OTHER PUBLICATIONS

Welland et al., AES PREPRINT 1562, (G-7), "The MD (Mini-Disk) System-A Contribution to the Digital Audio Disk Standard".
Vries, L. B., AES PREPRINT 1548, (G-8), "Error Control System of Philips Compact Disc".

Primary Examiner—Charles E. Atkinson
Attorney, Agent, or Firm—E. M. Whitacre; J. S. Tripoli; E. P. Herrmann

[57] ABSTRACT

A high performance disc record recording system wherein a digital manifestation of the signal to be recorded modulates a first carrier frequency and a temporally displaced analog manifestation of the same signal modulates a second carrier frequency. The modulated carriers are linearly combined for recording in a single record track. The digital signal is encoded for error detection and/or correction. On playback the modulated carriers are separated and demodulated. One of the separated signals is delayed so that the two signals are returned to temporal coincidence. The digital manifestation of signal is reconverted to analog format and utilized as the primary output signal. However, upon detection of errors in the digital signal the analog manifestation of the signal is substituted for the primary signal.

12 Claims, 4 Drawing Figures

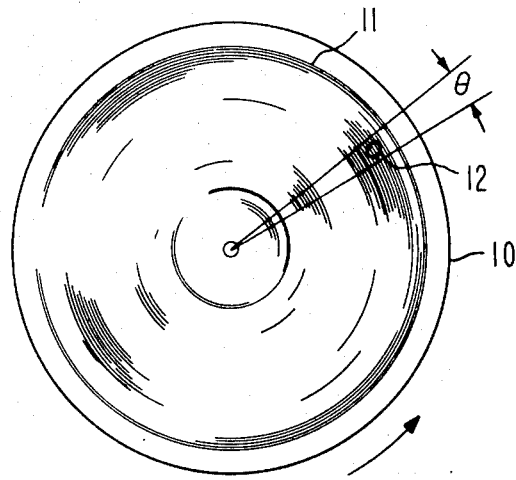
Fig. 1
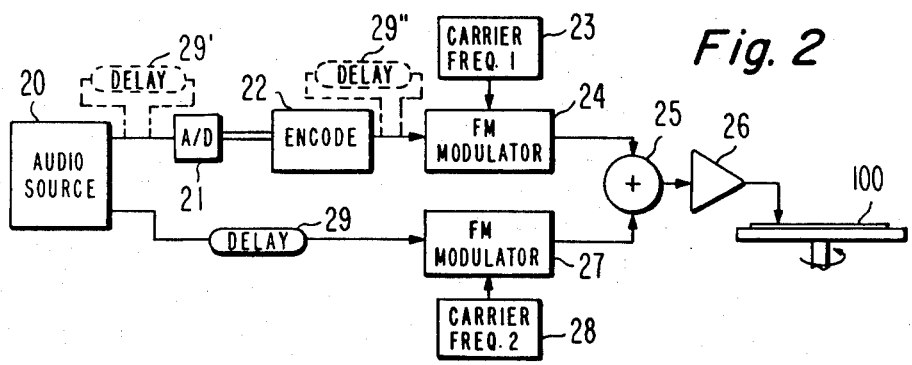
Fig. 2
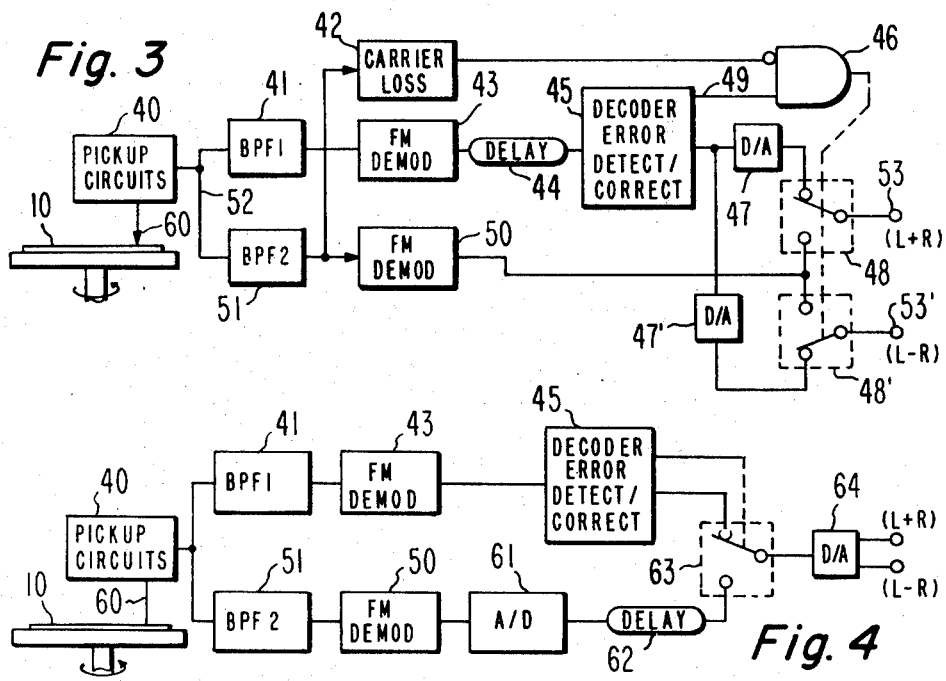
Fig. 3
Fig. 4

DISC RECORD SYSTEM EMPLOYING SIGNAL REDUNDANCY

This invention relates to a disc record player for recovering audio signal recorded in digital and analog format on high density disc records.

In order to meet the demanding standards of the audiophile, the recording industry is turning toward recording audio programming in digital format. Digitally encoded audio recordings tend not to degrade in performance with repeated play of the recording media, at least not to the same extent as the analog counterpart. Errors may however occur in the recovery of the digital signal as a result of typical record-pickup transducer interface deviations and record imperfections and defects. However, the signal may be encoded in such a way as to be susceptible to error detection and correction by appropriate circuitry resident in the player apparatus. The maximum duration of a particular correctible error is dependent upon the encoding used, the available bandwidth of the system and other variables. Generally, it is not currently economically practical to produce a system capable of correcting all errors to the satisfaction of the more demanding audiophile.

In order to obtain the necessary recording bandwidth, the medium used to record digital audio signals is basically similar to the medium used to record color television programs. Signal recovery and the gross signal format of the recorded information are also similar. The designers of the TV record playback apparatus, e.g., video disc players, video cassette recorders, etc. encountered the problem of signal defects and dropouts and solved the problem by substituting time delayed signal for defective recovered signal. This technique generally provides a corrected signal without observable or objectionable discontinuities and is possible only because of the generally high redundancy of information present in the video signal. Such an error or defect correction scheme is not possible for recorded audio signals because the high degree of signal redundancy does not exist and secondly, because the ear is more sensitive to audio simulus then the eye is to video stimulus.

The present invention describes a system wherein audio signal is encoded and applied to modulate a first carried frequency in digital format, and a time displaced manifestation of the same signal is applied to modulate a second carrier frequency, said first and second carrier frequencies being linearly added to form a composite signal which is recorded on the record medium. The audio player apparatus comprises a signal pickup transducer which cooperates with the record medium for recovering signal therefrom. Circuitry coupled to the pickup transducer separates the first and second modulated carriers of the recovered signal. A first demodulator circuit removes the digital signal from the first carrier, which signal is then applied to a decoder circuit. The decoder detects and corrects particular errors in the recovered digital signal and restores the signal to the original unencoded digital manifestation of the audio signal. The decoder also provides a control signal whenever errors are detected that are not amenable of correction. A digital/analog converter reduces the decoded signal to a first analog manifestation of the recorded audio signal. Delay circuitry is incorporated within the foregoing circuitry to temporally align the resultant analog audio signal with the recorded time displaced analog audio signal.

A second demodulator circuit removes the time displaced analog signal from the second carrier frequency. Switch means responsive to the control signal from the decoder circuit applies the audio signal derived from the recorded digital signal to an output terminal and on the occurrence of uncorrectable digital errors substitutes thereat the audio signal derived from the recorded time displaced audio signal.

The invention will be readily understood from the following detailed description in conjunction with the accompanying drawings.

In the drawings:

FIG. 1 illustrates a disc recording containing an exaggerated surface defect;

FIG. 2 is a block diagram of circuitry for generating a combined analog/digital audio signal for recording on a disc medium; and FIGS. 3 and 4 are respective block diagrams of circuitry for recovering a composite analog/digital audio signal from a disc medium with means for selectively utilizing the analog audio signal upon the occurrence of error prone digital audio signals.

In FIG. 1 a disc record 10 has information recorded in spiral or circular tracks 11. The disc record is presumed to be of the high density type such as the video disc in order that high frequency signals may be recorded thereon. As a result, the track pitch and the information are extremely small, e.g., in the order of micrometers. As a consequence of the fine dimensions, the disc is susceptible to surface defects 12 which obliterate portions of the recorded information where defects of comparable size on traditional audio records would effectively be unnoticed and unobjectionable.

The defect 12 obliterates signal in a segment of a track defined by the angle $\theta$. On signal playback the disc 10 rotates at an angular velocity $\omega$ to create a relative velocity between the respective information tracks and a signal pickup transducer. The time duration of signal lost per track is therefore $T = \theta/\omega$. Consider the maximum predicted signal loss to correspond to $T_{max}$. If a redundant signal is recorded on the disc at a position either advanced or delayed with respect to the primary signal by a distance corresponding to a time at least as large as $T_{max}$, the redundant signal may be substituted for the primary signal when a defect is detected. The recorded manifestation of the redundant signal, being displaced on the record from the primary signal, is not likely to be affected by the same defect and thus there is a high probability that both the primary and redundant signal will not be simultaneously obliterated.

It is desirable to record the primary signal and the redundant signal in the same information track. However, a high quality digital audio signal, e.g., a 20 KHz audio signal sampled at a 50 KHz rate utilizing 16 bits per sample, results in a basic digital audio data rate of 800 Kb/s per channel before the addition of error check overhead bits. Two channels of audio for stereo reproduction with error detection/correction information requires a signal bandwidth of about 3 MHz, which is approaching the limits of the typical video bandwith recorded on video tape and video discs. It should be readily apparent that redundant signals of like digital format cannot be recorded in a single information track because of the bandwidth limitations. However, there is sufficient bandwidth to incorporate a high quality digital signal and a monaural analog signal in a single track.

The monaural signal will only be substituted for periods of defective digital audio signal of relatively short duration, e.g., tens of microseconds, and the monaural quality will therefore be substantially unnoticed and be a substantial improvement over a total loss of signal.

An advantage of using a redundant analog signal with its inherent lower bandwidth compared with its digital counterpart is that the low bandwidth analog signal is less susceptible to short duration defects in the disc record that tend to cause impulse noise in high frequency signals. The low pass frequency of the analog processing circuits integrate high frequency defect noise rendering them unnoticeable. Thus, the redundant analog signal can be recovered without appreciable noise due to disc defects and without sophisticated signal processing.

FIG. 2 indicates, in block form, circuitry for generating the redundant analog-digital signal. Audio source 20 is a source of high quality analog audio signals. These signals are applied to an analog-digital (A/D) converter 21 which samples and converts the signals to digital format. The digital manifestations of audio signals are applied to an encoder 22 which operates on the digital signals making them amenable for error detection after subsequent transmission. The encoder may be of the type which simply checks parity and adds parity check bits. On the other hand, it may incorporate more sophisticated error detection/correction techniques such as are described in copending application Ser. No. 084,393 filed Oct. 12, 1979 and entitled "Video Disc System" or see U.S. Pat. No. 4,145,683 entitled "Single Track Audio-Digital Recorder and Circuit For Use Therein Having Error Correction" and U.S. Pat. No. 4,211,997 entitled "Method and Apparatus Employing An Improved Format for Recording and Reproducing Digital Audio."

The encoded signal is applied to circuitry 24 which frequency modulates a first carrier waveform generated by a first constant frequency oscillator 23.

Signal generated in the audio source 20, e.g., the left plus right (L+R) stereo channel, is also applied to a delay element 29 which time displaces this signal with respect to its digital counterpart. Element 29 may be an analog charge transfer device as, for example, a serial charge coupled device (CCD) delay line. The delayed signal is applied to circuitry 27 for modulating a second carrier frequency generated by stable oscillator 28. The second carrier frequency is considerably lower in Hertz than the first carrier frequency, i.e., the ratio of frequencies is approximately 1:10 with the higher frequency carrier centered about 5 MHz, for example. The two modulated carriers are linearly combined in circuitry 25 and subsequently conditioned in amplifier 26 for recording on a master disc 100. For a more complete description of combining two modulated signals for disc recording, see U.S. Pat. No. 3,911,476 entitled "Color Picture/Sound Record" and U.S. Pat. No. 4,044,379 entitled "Method and Apparatus for Electromechanical Recording of Short Wavelength Modulation in a Metal Master," both inventions being assigned to the common assignee with the present invention. While the FIG. 2 circuitry applies delay to the analog manifestation of the signal with respect to the digital manifestation it should readily be appreciated that an alternative circuit configuration may apply the signal delay to the digital manifestation of signal as indicated by elements 29' and 29".

FIG. 3 illustrates in block form circuitry for recovering and processing the information recorded on a disc record 10. Signal pickup transducer 60 cooperates with the disc record 10 and the pickup circuitry 40 to produce a signal at connection 52 substantially equivalent to the composite signal produced by the circuitry 25, i.e., the linear combination of the first carrier FM modulated with the digital manifestation of the audio signal and the second carrier FM modulated with the time delayed analog manifestation of the audio signal. The first modulated carrier is extracted from the composite signal by a first bandpass filter 41, and then demodulated in circuitry 43. The resulting digital signal is applied to the decoder 45 which restores the encoded digital signal for application to the digital-to-analog converter 47. Digital-to-analog converter 47 restores the digital signal to an analog manifestation of the audio signal, which signal is applied as a primary signal to output terminal 53 by the switch means 48.

The decoder 45 complements the function of the recording encoder 22, i.e., it is designed to examine the recovered signal for errors and produce an error signal at connection 49 upon the occurrence of such errors. The error check bits are removed from the data stream and the signal restored to the format similar to the pre-encoded digital format produced by the recording analog-to-digital converter 21. In addition, depending upon the coding utilized, the decoder may be designed to correct particular errors and provide an error signal on the occurrence of uncorrectable errors.

The recovered signal at connection 52 is also applied to bandpass filter 51 which extracts the second modulated carrier from the composite signal. The second carrier is demodulated in circuit 50 and applied to a second pole of switch 48 for selective application as a secondary signal to output terminal 53 upon detection of errors occurring in the primary signal.

The primary and secondary signals are brought into temporal coincidence by the delay element 44 serially arranged in the digital signal channel. Since the analog audio signal is recorded delayed with respect to the digital audio signal, delaying the recovered digital signal by a similar amount restores the information content of both signals to time synchronization. The decoder and digital-to-analog converter circuits may impart more or less signal processing delay to the signal than the encoder and analog-to-digital converter circuits, and the delay incorporated in element 44 compensates for such differences. The delay element 44 is indicated between the demodulator 43 and decoder 45 but it may in some situations be more advantageous to include the delay element either between the decoder 45 and converter 47 or between converter 47 and switch means 48.

A carrier loss circuit 42 monitors the second modulated carrier provided by bandpass filter 51 and generates a control signal when the carrier amplitude drops to a level at which the signal-to-noise ratio of the secondary signal will be unacceptable. The control signal and the error signal from decoder 45 are applied to AND circuit 46, the output of which is arranged for controlling the switch means 48. The control signal precludes the switch means from applying the secondary signal to the output terminal if the secondary carrier is lost.

FIG. 4 illustrates a further embodiment of the invention wherein like numbers indicate similar circuit elements to those described with relation to FIG. 3. With respect to the FIG. 4 embodiment, the recorded digital audio signal is assumed to be delayed with respect to the recorded analog audio signal, thus, the compensating delay element 62 to produce temporal coincidence between the primary and secondary signals is serially interposed in the analog channel. The primary difference between the FIG. 3 and FIG. 4 embodiments is the imposition of the analog-to-digital converter 61 which converts the recovered, demodulated analog signal to digital format. This enables the substitution of the secondary signal to be performed ahead of the digital-to-analog converter 64, greatly simplifying the switch means 63 with respect to the switch 48 required in the FIG. 3 circuit. The signal applied to switches 48 are presumed to have very high signal-to-noise ratio and any switch noise occurring at this point is objectionable. The signals applied to switch 63 in the FIG. 4 circuit on the other hand are digital and relatively easily immunized from switch noise.

The foregoing describes a record system utilizing a composite signal including a high frequency carrier FM modulated with a digital audio signal and a lower frequency carrier FM modulated with a monaural analog audio signal. It should be noted that a third lower frequency carrier similar to the second carrier may be added to the composite recorded signal so that the second and third carriers contain analog stereo components of the audio signal, which components may be respectively substituted for lost digital components of the primary signal. In addition, although the systems described refer to disc records the invention is applicable to recording/reproducing signal to and from a high density tape recording medium.

What is claimed is:

1. In an apparatus for recording high density recording media with audio signals for subsequent recovery by a compatible playback apparatus, the combination comprising:

a source of analog audio signal;
   first and second sources for providing first and second carrier signals respectively;
   an analog-to-digital converter responsive to said analog signal for generating a digital manifestation thereof;
   means for encoding the digital manifestation of the analog signal to permit detection of errors in recovered signal by said playback apparatus;
   means for temporally delaying the analog audio signal relative to the encoded digital manifestation thereof;
   means responsive to said encoded digital manifestation of the analog signal for modulating said first carrier signal;
   means responsive to said delayed analog signal for modulating said second carrier signal therewith;
   means responsive to the first and second modulated carriers for providing the linear sum thereof;
   means responsive to said linear sum for conditioning the linear sum for application to a recording mastering transducer, and wherein
   the temporal relationship of the digital and analog manifestation of the audio signal permits preferential recovery of the encoded digital signal manifestation in said compatible playback apparatus, and substitution of recovered delayed analog audio signal when errors occur in recovered digital signal.

2. The apparatus set forth in claim 1 wherein the means for delaying the analog signal comprises an analog delay element connected between the analog signal source and the means for modulating the second carrier signal.

3. In an apparatus for recovering audio signal from high density record medium, the recorded signal being the composite of the linear sum of a first carrier modulated with an encoded digital manifestation of the desired signal and a second carrier modulated with an analog manifestation of the desired signal and wherein the analog and digital manifestations are time displaced with respect to each other, the combination comprising:

pickup circuitry cooperating with a pickup transducer and the record medium for recovering the composite signal therefrom;
   first and second bandpass filters responsive to the recovered signal for respectively extracting the first and second modulated carriers from the composite signal;
   first and second demodulator circuits responsive respectively to the first and second extracted modulated carriers for recovering the digital and analog manifestations of the desired signal from the first and second carriers respectively;
   decoder circuitry responsive to the digital manifestation of signal for decoding said digital signal and generating a control signal responsive to errors in the digital manifestation of signal;
   a digital-to-analog converter responsive to the decoded digital signal for providing at a first terminal an analog representation of said digital manifestation;
   means responsive to said control signal for selectively applying the analog signal recovered by said second demodulator to an output terminal, and applying thereto the analog signal at said first terminal otherwise; and
   delay means serially connected between the means for selectively applying signal to the output terminal and one of said first and second demodulator circuits for conditioning the analog signal at the first terminal and the analog signal recovered by the second demodulator to be in termporal coincidence.

4. In an apparatus for recovering signal from a record medium, said signal comprising a composite signal having redundant temporally displaced information on separate modulated carriers, the combination comprising:

means for recovering the composite signal from the record medium;
   respective means for extracting said separate modulated carriers;
   respective means for demodulating said separate carriers to produce at least a first digital signal and a second analog redundant signal;
   means operable on one of said first and said redundant signals for conditioning said signals to be in substantial temporal coincidence;
   means for detecting errors in said first demodulated signal and generating a control signal responsive to said errors; and
   means responsive to the control signal for applying said first signal to an output terminal in the absence of errors in said digital signal, and applying said temporally coincident redundant signal thereto otherwise.

5. The combination set forth in claim 4 wherein said first signal is an encoded digital manifestation of the desired signal and the combination further comprises:

a decoder for decoding the encoded signal, said decoder being designed to detect and correct particular errors and to produce said control signal upon the occurrence of noncorrectable errors; and a digital-to-analog converter for converting the decoded digital signal to an analog manifestation of said first signal for subsequent application to said output terminal.

6. The combination set forth in claim 4 wherein the means for conditioning said signals to temporal coincidence comprises a delay element serially connected with the means for demodulating said carrier to produce said first signal.

7. The combination set forth in claim 4 wherein the means for conditioning said signals to temporal coincidence comprises a delay element serially connected with the means for demodulating said carrier to produce said redundant signal.

8. In a disc record player the combination comprising:

means for recovering a composite audio signal including a first carrier modulated by a primary digital signal and a second carrier modulated by a temporally displaced analog redundant signal from a disc record;

first serial signal processing circuitry for extracting the primary component of the recovered signal and conditioning said signal for application to an output terminal;

second serial signal processing circuitry for extracting the redundant component of recovered signal and conditioning said signal for application to said output terminal;

means included in one of said first and second serial signal processing circuits for conditioning the respective signal to temporal coincidence with the other signal;

error detection means for generating a control signal responsive to errors in said primary digital signal; and switch means responsive to said control signal for selectively applying said redundant signal from said second serieal processing circuitry to said output terminal and applying the primary signal from said first serial signal processing circuitry to said output terminal in the absence of said control signal.

9. The combination set forth in claim 8 wherein the first serial signal processing circuitry includes;

a bandpass filter having an input terminal connected to the means for recovering signal from the disc record and having an output terminal;

an FM demodulator having an output terminal and having an input terminal connected at the bandpass filter output terminal;

digital decoder circuitry for decoding a digitally encoded signal manifestation of the demodulated signal correcting particular errors therein and producing a control signal responsive to uncorrectable errors in the demodulated signal;

means connecting the digital decoder to the demodulator output terminal; and a digital-to-analog converter for converting the decoded signal to an analog manifestation of said signal, said converter having an output connection connected to the switch means.

10. The combination set forth in claim 9 wherein the second serial signal processing circuit includes:

a further bandpass filter turned to select a different frequency than the first filter, said further filter having an input terminal connected to the means for recovering signal from the disc record, and having an output terminal;

a further FM demodulator having an output terminal and having an input terminal connected to the further bandpass filter output terminal; and means connecting the further demodulator output terminal to said switch means.

11. The combination set forth in claim 8 wherein the first serial signal processing circuitry includes:

first means for extracting a first carrier signal modulated by said primary signal from the recovered signal;

second means for demodulating the extracted first carrier signal;

third means for decoding a digitally encoded manifestation of the demodulated primary signal, correcting particular errors therein and generating a control signal responsive to uncorrectable errors in said primary signal, said third means having an output connection to the switch means; and said combination further including a digital-to-analog converter having an input terminal connected to said output terminal and havine output terminals at which an analog manifestation of the recovered signal is available.

12. The combination set forth in claim 11 wherein the second serial signal processing circuit includes:

fourth means for extracting a second carrier signal modulated by said redundant signal from the recovered signal;

fifth means for demodulating the extracted second carrier signal;

an analog-to-digital converter for converting the demodulated redundant signal to digital format; and means for applying the digitally formatted redundant signal to said switch means.

* * * * *

UNITED STATES PATENT AND TRADEMARK OFFICE
CERTIFICATE OF CORRECTION

PATENT NO. : 4,382,299

DATED : May 3, 1983

INVENTOR(S) : Charles Benjamin Dieterich

It is certified that error appears in the above-identified patent and that said Letters Patent is hereby corrected as shown below:

| | |
|---|---|
| Column 1, line 44 | "then" should be --than--. |
| Column 7, line 47 | "serieal" should be --serial--. |
| Column 8, line 17 | "turned" should be --tuned--. |
| Column 8, line 42 | "havine" should be --having--. |

Signed and Sealed this

Twelfth Day of July 1983

[SEAL]

Attest:

GERALD J. MOSSINGHOFF

Attesting Officer

Commissioner of Patents and Trademarks